UNITED STATES PATENT OFFICE.

THOMAS JAMES, OF BALTIMORE, MARYLAND.

IMPROVEMENT IN COMPOSITIONS FOR FIRE-BRICKS.

Specification forming part of Letters Patent No. 147,642, dated February 17, 1874; application filed January 29, 1874.

*To all whom it may concern:*

Be it known that I, THOMAS JAMES, of Baltimore, Maryland, have invented a new and useful Composition for Fire-Bricks, of which the following is a specification:

My invention consists in the combination of crushed quartz or pure silicious sand or gravel with pipe clay and water of lime, as a composition for the manufacture of fire-brick for furnaces of any description.

My preferred mode of carrying out the invention is as follows: Take of silex about eighty-nine parts; pipe-clay, about ten parts; quicklime, about one part. The lime is dissolved in a tight box, covered to prevent loss, and allowed to stand twenty-four hours, the quantity of water being sufficient to make, with the silex and clay, a paste or mortar of the proper consistency for molding, as hereinafter described.

The silex, if in the form of quartz pebbles, is prepared by burning in a kiln similar to a limekiln, with coke, wood, sawdust, or other fuel, to destroy foreign matter, and is then crushed or ground with iron rollers.

The clay which I find best adapted to the purpose is German pipe-clay. American fire-clay may be used, but the result is not so good.

The silex and clay being prepared, as above described, and mixed together, the water of lime is run onto them and thoroughly mixed in proper consistency for molding. The molding and burning are then performed in customary manner.

I claim as new—

A fire-brick composition consisting of about eighty-nine parts of silex, ten of clay, and one of lime, substantially as explained.

THOMAS JAMES.

Witnesses:
WM. S. MURPHY,
JNO. T. MADDOX.